United States Patent [19]
Ward

[11] Patent Number: 4,868,730
[45] Date of Patent: Sep. 19, 1989

[54] DC TO DC CONVERTER CURRENT PUMP

[75] Inventor: Michael A. V. Ward, Arlington, Mass.

[73] Assignee: Combustion Electromagnetics, Inc., Arlington, Mass.

[21] Appl. No.: 179,953

[22] PCT Filed: Jul. 14, 1987

[86] PCT No.: PCT/US87/01661
§ 371 Date: Dec. 11, 1987
§ 102(e) Date: Dec. 11, 1987

[87] PCT Pub. No.: WO88/00768
PCT Pub. Date: Jan. 28, 1988

Related U.S. Application Data

[63] Continuation-in-part of Ser. No. 885,912, Jul. 15, 1986.

[51] Int. Cl.[4] .................................... H02M 3/335
[52] U.S. Cl. ..................................... 363/21; 363/16;
363/60; 323/224; 320/1; 123/596; 123/605
[58] Field of Search ................. 323/222, 224; 363/16,
363/20, 21, 59, 60, 61, 97; 320/1; 307/109, 110;
123/596, 597, 604, 605, 650, 652–656

[56] References Cited

U.S. PATENT DOCUMENTS

| | | | |
|---|---|---|---|
| 4,017,780 | 4/1977 | Cowett, Jr. | 363/16 |
| 4,184,197 | 1/1980 | Cuk et al. | 363/16 |
| 4,257,087 | 3/1981 | Cuk | 363/16 |
| 4,317,068 | 2/1982 | Ward et al. | 315/209 CD |
| 4,457,285 | 7/1984 | Hamai et al. | 123/605 |
| 4,559,590 | 12/1985 | Davidson | 363/21 |
| 4,642,750 | 2/1987 | Raets | 363/56 |

FOREIGN PATENT DOCUMENTS

| | | | |
|---|---|---|---|
| 0855245 | 8/1981 | U.S.S.R. | 123/596 |
| 2184901 | 7/1987 | United Kingdom | 363/21 |

OTHER PUBLICATIONS

Hexfet Databook published by International Rectifier, 1981, pp. 36–39.

*Primary Examiner*—Peter S. Wong
*Attorney, Agent, or Firm*—Jerry Cohen

[57] ABSTRACT

A DC to DC power converter designated a synchronous current pump (13) and operated in the preferred mode in synchronization with a discharge circuit (11) and using a capacitor (28) as the energy storage element, and in the preferred embodiment has in series with said capacitor the battery supply (10), an inductor (30), a diode (27a), and the primary winding (31a) of a transformer (31); and across said storage capacitor is an energy transfer FET switch (33) which is used for discharging said capacitor and transferring it stored energy to a output load capacitor (4) connected through a diode (32) to the secondary winding of said transformer. In operation, the current pump supplies power efficiently and smoothly to a load discharge capacitor in synchronization with operation of the discharge circuit.

50 Claims, 4 Drawing Sheets

DC TO DC CONVERTER CURRENT PUMP

This is a continuation in part of application Ser. No. PCT/US87/01661, filed July 14, 1987.

FIELD OF THE INVENTION

The present invention relates to DC to DC converter power supply systems.

BACKGROUND OF THE INVENTION AND PRIOR ART

The need for, and actual designs of, DC to DC converters for converting automobile battery voltage to a higher voltage for charging a capacitor of a capacitive discharge ignition system are known in the prior art. These converters generally operate on the principle of switching an inductive current and are thus sensitive to load conditions, are generally not as efficient as desired, and are often more complex than desired.

The provision of "boost power" during the ignition firing period (which consists of several ignition pulses separated by non-pulsing periods) so as to reduce the decay rate of the voltage of the various pulses is disclosed herein by me as a baseline for further improvements disclosed herein.

The present invention comprises a novel form of DC to DC converter power supply which, among other things, uses a capacitor and not an inductor as the storage element, and is load insensitive, is efficient, is simple, and is to able to operate synchronously with the operation of the ignition discharge circuit and thus provide some level of power boost even at moderate power levels.

OBJECTS OF THE INVENTION

It is a principal object of this invention to provide a power supply with a capacitor as tne energy storage element, and which is simple and practical and provides power smoothly to an output load capacitor which may be discharged in a time regular way, the power supply called a "synchronous current pump" when operated in synchronization with said time regular discharge; said current pump made up of a large capacitor, a transformer, an inductor, diodes and switches, and operating as a CD circuit providing "slugs" of current synchronously with the output CD circuit firing. In general, because of the power supply's generally synchronous operation with the load capacitor discharge, it in effect also provides "boost power" or high power during the spark pulsing period to maintain a higher voltage during this period.

Another object is to provide several forms of such current pump including a particular simple form (the simplified current pump) which has only one switch in its input circuit (i.e. the battery-side switch is replaced with a diode and an inductor, if an inductor is not otherwise present).

Another object is to provide an optimized simplified current pump which includes across the transformer secondary winding in parallel with the output load capacitor and diode a small tuning and feedback capacitor whose value is precisely determined by circuit principles to provide optimized current pump timing and positive electrical energy feedback, to provide high output power, very simple and low cost design, and a very high efficiency when the current pump is operated in a timed manner determined by this optimized circuit.

Other features and advantages will be pointed out hereinafter, and will become apparent from the following discussion including a Summary of the invention and Description of Particular Preferred Embodiments of the invention when read in conjunction with the accompanying drawings.

SUMMARY OF THE INVENTION

This invention comprises a novel DC to DC converter (called a "current pump") used principally for charging a high voltage output capacitor of a capacitive discharge (CD) ignition circuit. The current pump uses a storage capacitor to store the energy, and itself operates on the principle of a CD circuit by using a shunt switch across the storage capacitor and the primary of a transformer to discharge the storage capacitor and charge the output of load capacitor connected to the output of the transformer. If used to provide power boost, then the current pump is preferably operated synchronously with the ignition pulses to provide slugs of energy in between the pulse firings.

The size of the current pump storage capacitor is much less in value to the the "transformed" output capacitor (generally the order of ten times greater than the actual value of the output capacitor for a four hundred volt CD ignition system with an output capacitor in the range of 2 to 10 microFarads (uFarads)). Preferably FET semiconductor switches are used for the main energy transfer (for transferring energy from storage to load capacitor).

In operation, the storage capacitor is charged from the battery to twice battery voltage (due to voltage doubling), and then discharged through a (FET) switch, the first half cycle of the energy discharge in general transferring most of the energy to the load capacitor. During the storage capacitor charging time or at any time excepting the first cycle of the energy discharge stage, the ignition capacitor may be discharging.

In this way is provided a power supply for use especially with a CD system which is load insensitive, simple, efficient, and which can operate synchronously with the CD circuit for optimal transferring of energy to the load. As an optimized simplified current pump, this power supply represents a particularly simple power supply which uses positive feedback and precise tuning to provide a very high power output and very high efficiency.

The invention may be used in automobile and other ignition systems, and may be used in other than ignition systems of capacitor load form.

BRIEF DESCRIPTION OF THE DRAWINGS

The nature and objects of the invention are illustrated and described with reference to the following drawings, which also illustrate the preferred embodiments of the invention.

DESCRIPTION OF PREFERRED EMBODIMENTS

Figure 1:
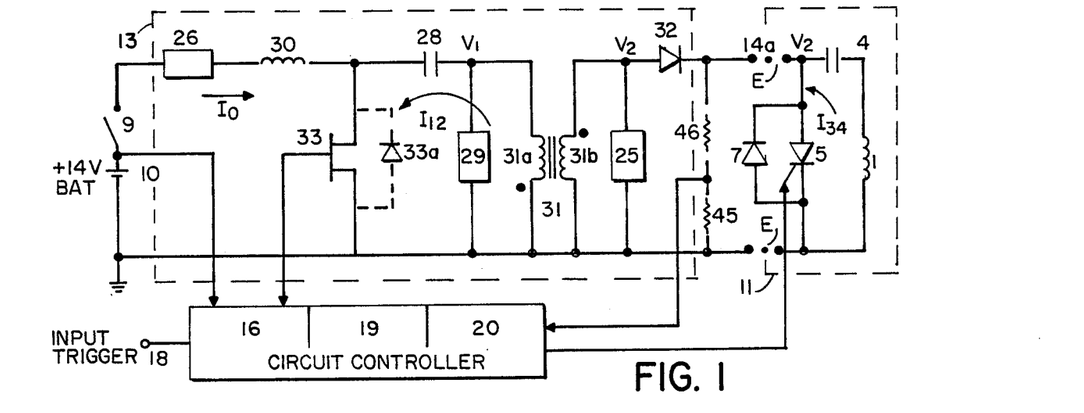
FIG. 1 depicts a generic form of the current pump connected to a discharge circuit and including controls for regulating the output voltage and operating the discharge circuit and current pump.
Figure 1A:
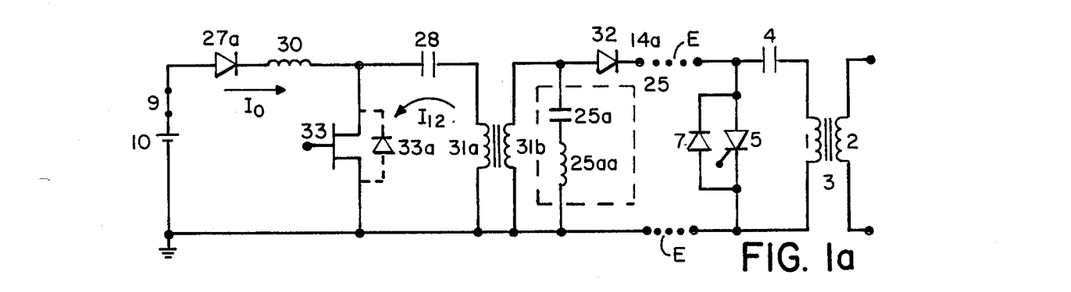
FIGS. 1a to 1d depict preferred embodiments of the current pump.

FIG. 1 shows a generic form of the current pump type DC to DC power converter 13 designated to operate generally with fifty to one hundred watts output power (for a four stroke, four to eight cylinder engine) and with a high efficiency of about 80%. Preferably, the converter has the ability to provide higher peak or "boost" power during ignition, as is discussed below with reference to FIG. 3b and elsewhere. In its main application it is used for charging capacitor 4 of capacitance C (or C1) microfarads (uFarads) which is in series with primary winding 1 of a coil of a CD system 11 including SCR switching element 5 and diode 7, and the balance of which may include an ignition firing tip as shown in FIG. 1a or may comprise other loads.

Current pump 13 operates once ignition switch 9 is closed by sequentially depositing energy provided by battery 10 into capacitor 28 of capacitance Ce (or CO) through semiconductor element 26 and choke inductor 30, and discharging the stored enegy through shunting switch 33 (FET shown) and transformer 31 (of turns ratio N) to charge capacitor 4 of DC circuit 11 connected to terminal 14a. Typically, the peak energy stored in capacitor 4 (C) is much greater than the peak stored in capacitor 28 (Ce), the parameter "Lambda" designating this ratio, which is given by:

Lambda=((N**2)*C)/Ce, where "**" means exponentiation.

Typically Lambda is in the range of 10 to 100, depending on how large the peak energy stored in capacitor C is and how rapidly one wants to charge capacitor C. Lambda can be viewed as the number of energy slugs which the current pump must pump to fully charge capacitor C.

Advantages of this novel design are its simplicity, its ability to operate synchronously with the discharge of the CD circuit, its inherent smooth rise in current and voltage which prevents false triggering of the discharge circuit 11 (especially under boost operation where energy must be delivered rapidly to the output circuit), and its insensitivity to the load, i.e. current pump 13 is insensitive to the state of the CD circuit 11 in terms of whether SCR 5 is OFF on ON since the transformed output capacitance (N**2)*C is much greater than Ce, and thus the input circuit is designed to work into what is a short circuit for practical purposes.

In this generic form of current pump 13, element 26 may be a semiconductor switch or a diode, inductor 30 may be present or absent, and charging semiconductor element 29 may be present or absent (with capacitor 28 charging taking place through 31a when 29 is absent).

Diode 33' shown across shunting FET switch 33 (shown with broken lines) is integral to the FET and is used to conduct the second half current cycle of the discharge cycle of capacitor 28. Output element 25 can be a range of components which will be governed largely by factors relating to how to most efficiently handle the power that is coupled to the output circuit during the capacitor 28 charging stage and the second half of the discharge stage. During these conditions voltage V2 is negative and without proper design would dissipate power or not contribute to charging of load capacitor 4. Ellipsis sections E in the circuit indicate room for optional placement (or absence) of various control filtering or power draw or limiting components.

Figure 2A:
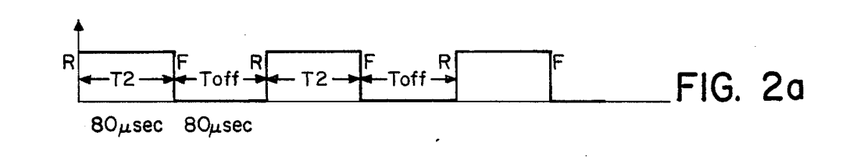
FIGS. 2a to 2e depict various waveforms corresponding to the operation of both the simplified synchronous current pump and the discharge circuit during its pulsing period.

We note that the Circuit Controller is made up of blocks 16/19/20. We have tacitly assumed that the control of generic current pump of FIG. 1 corresponds to that given with reference to FIGS. 1a to 2e, and not to that of FIG. 4 where a gate clock oscillator 21 for triggering SCR is needed. Controller 16, which includes an oscillator with waveform output shown in FIG. 2a, provides both the current pump control and the SCR 5 pulsing signal. Thus Controller (16/19/20) is very simple requiring only to perform the function referenced in FIG. 2a and to trigger the initial spark (which may be a ringing spark) upon receiving a trigger at input 18, and turning OFF the current pump 13 during the initial spark and restarting it at the end of the spark, and continuing as indicated in FIG. 2a.

FIGS. 1a, 1b, 1c, and 1d (only output stage shown) are preferred embodiments of the generic form of the current pump (FIG. 1) in which inductor 30 is always present and switching element 26 is a diode 27a. FET switch 33, capacitor 28, and coil 31 perform the same energy transfer function already described with reference to FIG. 1. Charging time of capacitor 28 is determined principally by values of inductor 30 (and capacitor 28). For a typical 50 uF value of capacitor 28, inductor 30 will have a value L (or LO) of about 60 uHenrey for a charging period TC/2 of 180 usecs (leakage inductance of coil 31 is assumed to add about 10 uHenry in the cases of FIGS. 1a and 1c). Such a charging rate corresponds to a power supply output of about 80 watts for 12 volts input (and noting that the charging is resonant or voltage doubling charging). Inductor 30 times constant T1 is very long, i.e. T1=L/r=50 uHenry/0.02 ohm=2500 usecs for example, so that the short circuit current IO (see FIG. 1) that flows while FET switch is ON for about 80 usecs (designated as IO) is limited by the inductance of inductor 30 (and not its resistance) to a value of 10 to 20 amps peak in this case. This corresponds to negligible resistive loss.

An important feature of the operation of the current pump is that since FET switch 33 is turned OFF preferably near its peak second half cycle, then current I12 tends to cancel current IO so the current through FET 33 is low or zero (negative) at TURN-OFF. Upon FET TURN-OFF, charging current IO is now steered to charge capacitor 28, and instead of a zero initial charging current, a current has been established which will speed up charging of capacitor 28.

FIG. 1a features the placement of a capacitor 25a and inductor 25aa (a reactive snubbing network) at the output of coil 31 to store and release (with minimum dissipation) energy during the charging state of capacitor 28. Energy (of a negative voltage polarity) is coupled to the output circuit during the capacitor 28 charging stage because of the voltage drop across winding 31a, which equals the fraction Le/L of the total primary voltage V1, where Le is the primary winding leakage inductance given by:

$$Le = Lp1 * (1 - K^{**}2)$$

where Lp1 is primary inductance of primary winding 31a, and K is the coupling coefficient of the coil 31; i.e. voltage drop across winding 31a generates current flow through the primary inductance 31a which couples power to the output winding 31b (in proportion to the primary leakage inductance Le of 31a to the inductance L of 30 as already stated). Snubbing network 25a/25aa will differ with each design, the objective being to experimentally pick those combinations of 25a and 25aa which maximize efficiency.

In this figure is also shown a typical ignition output circuit including secondary winding 2 of a coil 3, and output capacitance 9 and spark gap 106.

Figure 1B:
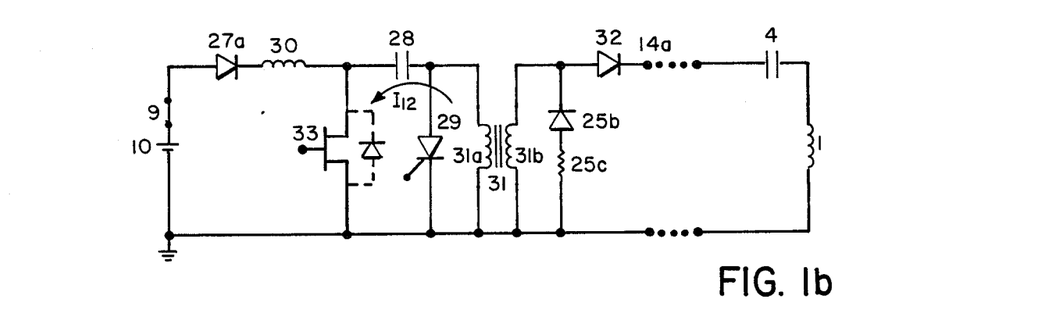

FIG. 1b differs principally from FIG. 1a by the presence of a bypass charging element 29 (an SCR shown in this case). The main disadvantage here is the need for the extra component and the loss it represents during the charging stage. The advantage is that in bypassing inductor 31a we have eliminated coupling losses and eliminated the influence that coil 31 has on charging rate. In this case a diode 25b and resistor 25c (of say 50 ohms) are used at the output since current through diode 25b is small.

Figure 1C:
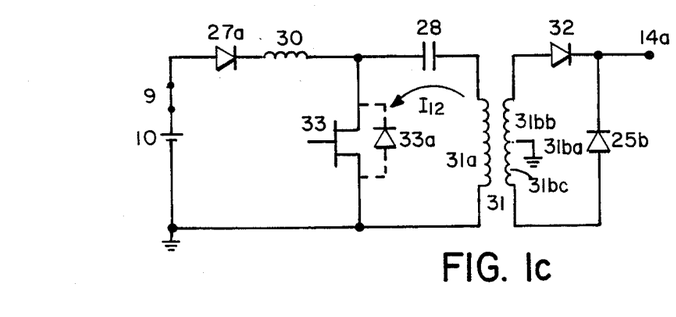

FIG. 1c differs from FIG. 1a in its output stage, which incorporates a full wave charging output stage with center tapped secondary 31ba with two windings 31bb and 31bc. Winding 31bc may have a much larger number of turns than winding 31bb to compensate for the lower (input) voltage coupled to it from the primary winding 31a. This is done in order for winding 31bc to produce a sufficiently high output voltage to overcome the output potential 14a (developed by winding 31bb) so that it "sees" load capacitor 4 and is able to contribute some charge, albeit relatively small, to the load during the charging of capacitor 28, and even during the second half cycle of discharge of capacitor 28.

Another useful construction of coil 31 is to have a tighter coupling between primary winding 31a and windings 31bc than between windings 31a and 31bb. This will provide the two benefits of a shorter second half discharge cycle of capacitor 28 and a correspondingly relatively higher output voltage (and higher second half cycle input current I12 for cancelling current IO during the TURN-OFF of FET 33. This can be accomplished by winding the two secondary windings 31bb, 31bc on different arms of sections of a magnetic (preferably ferrite) core and distributing the primary turns between the two, with more of the primary windings wound colinear with winding 31bc for tighter coupling to it.

However, it should be noted with reference to construction of output stage of windings of FIG. 1c (and FIG. 1d), which will be appreciated better with reference to FIGS. 2a through 2e, that one should preferably not fire the output CD circuit 11 (FIG. 1), if such a load circuit is connected, during the charging stage, (as is ideal in the case of FIGS. 1a, 1b) since in the present case one would be "shorting out" the supply during the time when winding 31bc delivers power. If such power delivery is negligible one may wish to ignore the "shorted output effect" during ignition firing and/or isolate the output from the short. However, preferably, the current pump is operated at a higher frequency, say at 12 KHz instead of at 6 KHz, and is shut off, say, every fourth cycle for ignition firing of the CD circuit 11 (during an ignition firing made up of a sequence of pulses at 3 KHz).

Figure 1D:
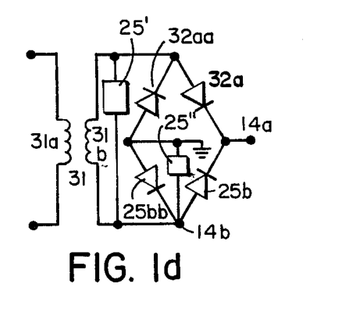

Finally, in FIG. 1d we show an output stage of the current pump with a full-wave bridge made up of diodes 32a, 32aa, 25b, 25bb, with cicuit elements 25' and 25" defined with respect to the specific current pump design. For example, if the coil 31 turns ratio N is much higher than dictated by the voltage regulation setting for normal operation, elements 25', 25" may be short circuits since the peak voltages across 31b for all stages of the current pump operation may be high enough to insure that 25b, 25bb also conduct when node 14b is of positive polarity.

Figure 2B:
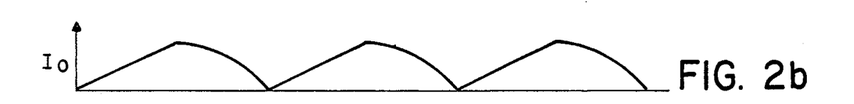
Figure 2C:
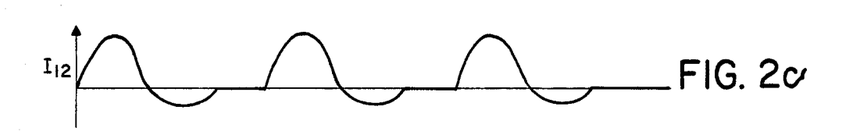
Figure 2D:
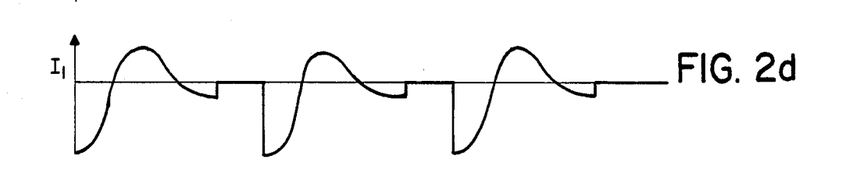
Figure 2E:
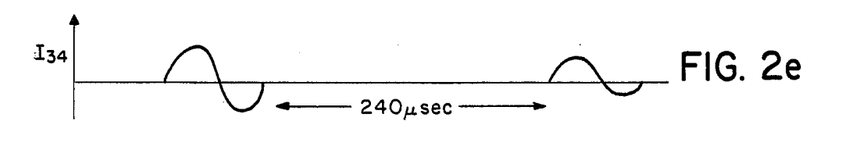

FIGS. 2a-2e depict waveforms of a typical operation of the current pump during the ignition pulsing period, i.e. when the CD circuit 11 is fired say every 320 usecs as indicated in FIG. 2e (at a 3 KHz frequency). Rectangular wave oscillations of FIG. 2a (generated by circuit 16 of FIG. 1) turn FET 33 ON at the rising edge R, and turns FET 33 OFF after time T2 (and SCR 5 ON every other time) at its falling edge F; and turns FET 33 ON again Toff time later. FIG. 2b shows the expected current flow with the current slopes differing before and after F. FIG. 2c shows the expected FET 33 switching current I12 (FIGS. 1–1c) which charges up capacitor 4. FIG. 2d shows the variation of voltage V1 (or V12) with time; and FIG. 2e shows the discharge current I34 through capacitor 4 (which has an assumed value of 5 uFarads i.e. 4.5–5.4 uFarads as per convention.

In all cases of operation, during the ignition firing period SCR 5 (FIG. 1) is triggered, and during the non-firing period it is not, but the current pump 13 continues to free-run during the non-firing period run until capacitor 4 is fully charged, which is controlled by information from voltage divider 45, 46 (FIG. 1).

Figure 3A:
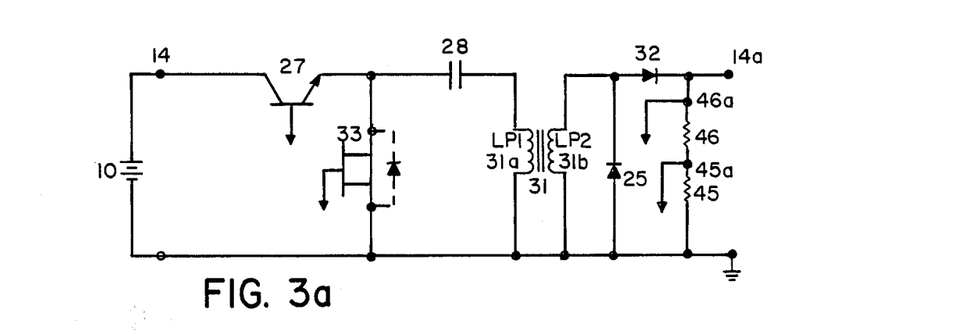
FIGS. 3a and 3b are circuit drawings of two forms of current pump DC—DC converter, a current pump with a switch in place of the input diode (FIG. 3a), and a current pump including an extra SCR switch (FIG. 3b).

In FIG. 3a transistor switch 27 is connected in series with battery 10, capacitor 28, and primary winding 31a of coil 31. When transistor 27 is turned ON, capacitor 28, which is generally initially discharged, is charged to near double battery voltage 2*VB. Output diode 25 allows current to flow in secondary winding 31b during the charging (while diode 32 is backbiased) to provide a short charge time Tch. given by:

$$Tch. = pi * SQRT(Lp1*Ce) * SQRT(1 - K^{**}2),$$

where pi=3.142, SQRT represents square root of, and "**" indicates exponentiation. Lp1 is inductance of winding 31a, Ce is capacitance of capacitor 28, and K is the coefficient of coupling of the coil 31.

When the charging cycle is complete, switch 33 is activated and transistor 27 is simultaneously turned OFF. Switch 33 (which can be an NPN transistor, SCR, or FET as shown) discharges capacitor 28 through winding 31a and transfers energy stored in capacitor 28 through diode 32 to output capacitor connected to terminal 14a. The energy transfer time (discharge time) is approximately equal to, and somewhat longer than, Tch., since the coupling parameter K is now slightly lowered (from say 0.994 to A high efficiency coil 3 connected to 14a has a low primary inductance relative to a conventional coil and hence only a small effect on K and hence on discharge time relative to the charge time. A typical charging time for this circuit is 80 microseconds which can be attained with the following component values:

> Lpl = 1000 microHenry ("uH"); K = .994
> Ce = 50 microFarad ("uF")
> N = 20 to 24 (N is the transformer turns ratio)

Peak charging current Ich is around 25 amps, and peak discharging current I12 is in the same range but depends on the output voltage conditions according to:

$$I12 = (V1 - V20/N)Z12$$

where V1 is voltage on 28, and V20 is voltage on a load output capacitor connected to terminal 14a, both just prior to switching of switch 33, and Z12 is the source impedance of combination capacitor 28 and winding 31a given by:

$$Z12 = SQRT(Lp1/Ce)*SQRT(1-K**2)$$

Power output is 100 watts and efficiency is 85% for a 2N5301 transistor and two parallel MTP25NO5 FETs making up switches 27 and 33 respectively.

This process of energy transfer continues until terminal 14a reaches a preset value of voltage sensed at junction 45a of output voltage divider 45/46. Point 46a is sensed to keep power supply OFF during the operation of discharge circuit 11. The voltage waveform V1 follows a simple cosine function, with a corresponding simple sinusoid current waveform.

Figure 3B:
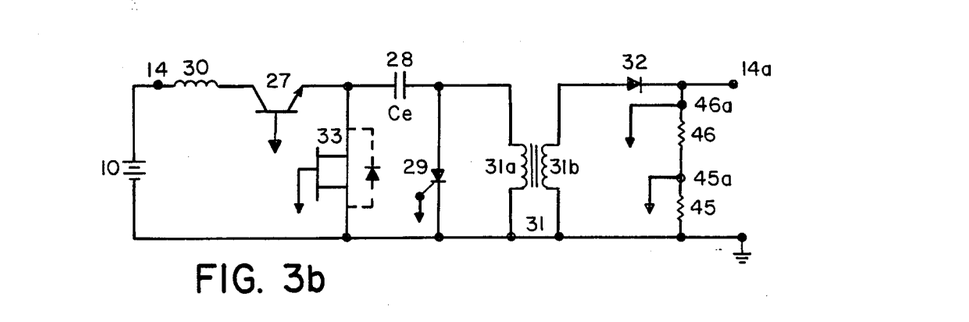
Figure 4:
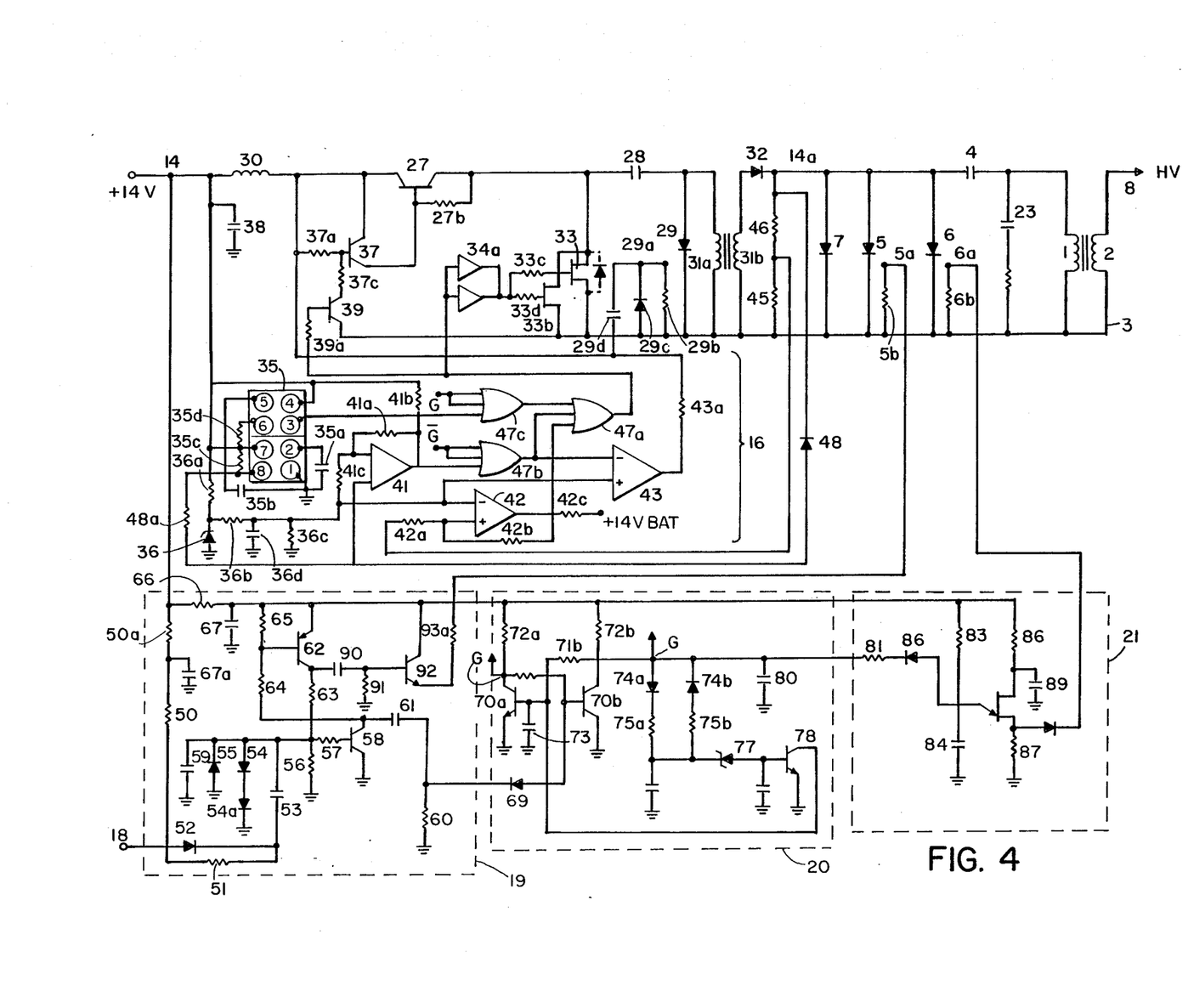
FIG. 4 depicts a detailed circuit drawing of the synchronous current pump and the input trigger shaper/initiator necessary to produce both the initial ringing spark and to initiate the gate pulse width controller used also to provide "power boost".

FIG. 3b represents the "synchronous" current pump (SCP) with "power boost" and is similar to the circuit of FIG. 3a except for the addition of switch 29 (SCR shown), inductor 30, and the elimination of diode 25. In addition, switches 27 and 33 are larger to handle the higher peak currents of about 50 amps during boost operation. In its operation it is identical to that of FIG. 3a during the non-boost stage defined by the time when circuit 11 (FIG. 1) in inactive (point G of FIG. 4 is low) except that the charge time Tchs is longer to give a higher efficiency to compensate for the lower efficiency during the boost period. When level G is high (circuit 11 is active), switches 27 and 29 are ON (and switch 33 is OFF) for the periods T2 of FIG. 2a, and switch 33 is ON (and switches 27 and 29 are OFF) during the OFF time Toff, shown in FIG. 2a. SCR 29 allows for rapid charging of capacitor 28 through inductor 30, which is chosen to give the desired boost charge time Tchb aproximately equal to circuit 11 firing time T2. For example, for the following values:

> Ce = 100 uF
> Le = 8 uH (where Le is inductance value of 30)
> Lpl = 160 uH
> N = 20;
> K = 0.99 gives:

> Tchb = pi * SQRT(Le * Ce) = 90 microseconds ("usecs")
> T12 = 50 usecs
> Tchs = pi * SQRT(Lpl * Ce) = 400 usecs where Tchb and Tchs are the times required to charge capacitor 28 during the boost time (G high) and the non-boost time (G low) respectively. T12 is the time required to discharge capacitor 28 and charge the output capacitor connected to terminal 14a. Tchs is longer than Tch because of the absence of diode 26 which presents an open output during the charging stage (for G low), i.e. there is no mutual coupling between the windings 31a and 31b, and hence the charging time constant is determined solely by inductor 31a in combination with capacitor 28. The peak boost currents Ichb, discharge current I12, and slow charge current Ichs are approximately 40 amps, 50 amps, and 15 amps respectively based on the above values. Suitable components for switches 27, 29, and 33 for these peak currents are Motorola 2N5685 (50 amp NPN transistor), MCR265-2 (55 amp, 50 volt SCR), and either two MTH35NO5 or three MTP25NO5 in parallel. The energy stored and discharged during each charge transfer (sequential firing of switches 27 and 33) is:

$$Esd = \frac{1}{2} *(Ce*(2VB)**2)$$

$$= 30 \text{ millijoules}$$

for the above values assuming battery voltage VB of about 12 to 14 volts. These values translate to a non-boost power of 70 watts and a boost power of 200 watts (versus a constant output power of 100 watts for the example of FIG. 3a).

With reference to the current pumps described in FIGS. 1 to 3b, we note that the peak voltage that capacitor 28 and FET 33 need to tolerate is twice the input voltage (although this may be higher if current IO is not allowed to complete its charge (half) cycle before FET switch is activated and IO builds up a DC component which can up to quadruple the input voltage on capacitor 28). The lowest practical rating of FETs is 50 volts, and of non-electrolytic (e.g. polypropelene) capacitors is 100 volts, i.e. one pays no less for these higher than needed ratings. Therefore, the current pump DC to DC converter is ideally suited for 24 volt applications, such as military vehicles, and commercial vehicles once the change is made to higher voltage batteries.

In the above preferred embodiments it is assumed that the preferred operation of the current pump is one with a high degree of synchronization with the operation of a CD ignition i.e. one does not need an additional timing oscillator circuit 21 shown in FIG. 4. Therefore, in viewing FIG. 4, one must note that inclusion of oscillator 21 provides an additional degree of freedom which may not be necessary.

FIG. 4 depicts a preferred embodiment of the invention (excluding the plug) incorporating the synchronous current pump (SCP) of FIG. 3b as the power supply means 13, and showing in detail a controller means 16 for controlling power supply means 13 in conjunction with discharge waveform generator composed of circuits 19, 20 and 21, described in U.S. patent application Ser. No. 688,020 (which is incorporated herein by reference), with the exception that in the present application, output of transistor 62 includes resistor 91 (instead of a diode 91) and additional NPN transistor 92 with resistor 93a at its output to hold gate 5a of "ringing" SCR 5 high for several discharge cycles of discharge circuit 11. In addition, the state of Gate Pulse Width controller 20 is used as an input to controller means 16 to signal it to operate in a normal (non-boost or idle) charging mode (G low), or in the high or "boost" mode (G high) for higher power output when the ignition is firing.

Controller 16 for SCP 13 includes a low voltage reference including zener diode 36, resistors 36a, 36b, 36c and capacitor 36d which serves to establish the reference for voltage regulator 42 and establish switching thresholds for comparators 41 and 43; an astable multivibrator including IC 35, capacitors 35a and 35b, and resistors 35c and 35d, which determines the frequency of switching in the idle mode (gate G low); logic gates 47a, 47b, 47c (NOR gates) and comparators 41 and 42 which sequence the switching in the two modes of operation (G high and low); transistors 37 and 39 and resistors 27b, 37a, and 37c which switch transistor 27 to conduct current from the battery to charge up capacitor 28 when transistor 39 is biased ON through resistor 39a; a shunt switch including FETs 33 and 33b and resistors 33c and 33d and C-mos drivers 34a and 34b, which shunts the current when 34a and 34b are activated by applying positive voltage to their inputs; a charge speed-up switch including SCR 29, resistor 29b, diode 29c, and capacitor 29d; a voltage divider including resistor 45 and 46; and a steering diode 48.

In the idle mode (gate signal G Low), power is supplied by SCP through the following operation. Since voltage 14a is below the regulation point (for SCP to operate), output of comparator 42 is held low; output of C-mos logic gate 47b is forced to logic low (since G is low), which fixes output of comparator 43 and prevents it from triggering the charge speed-up switch 29. Output of logic gate 47c is the inverse of the output (pin 3) of astable multivibrator 35 and, as long as the rectified secondary voltage 14a stays below the set point, the output of logic gate 47a is the inverse of the output of logic gate 47c, and is thus the same as the output of 35. Thus the astable multivibrator causes the series switch 27 and shunt switches 33a/33b to alternate with one being ON while the other is OFF. The frequency of oscillation is chosen to achieve efficient charging and discharging of the LC resonator 31a/28 and is determined by the natural frequency of the circuit (described with reference to FIG. 3b).

When the voltage regulation set point is reached comparator 42 changes state causing its output to become high which forces the output of logic gate 47a to become logic low, which switches OFF series pass switch 27 and switches ON the shunt switch 33. Resistors 42a and 42b of comparator 42 constitute a network which creates a small amount of hysteresis in the voltage regulator loop and avoids the possibility of oscillation in it. Resistor 42c is the pull-up resistor for the open collector output of the comparator 42.

In the boost mode (gate signal G at logic high), the output of logic gate 47c is formed low removing the astable multivibrator from the circuit. When rectified secondary voltage 14a is low i.e. less than a specified level of, say, 2.4 volts DC, steering diode 48 conducts causing the output of comparator 41 to become high and the output of logic gate 47b to become low. When output of 47b goes low, output of comparator 43 goes high, triggering gate 29a of SCR 29 and causing it to conduct which short circuits the primary of transformer 31 allowing for rapid charging of capacitor 28. At the same time the output of logic gate 47a goes high which switches OFF shunt switch 33a/33b and switches ON series pass switch 27 which charges capacitor 28.

When rectified secondary voltage 14a is high (greater than or equal to 2.4 volts DC), series pass switch 27 is turned OFF and shunt switch 33a/33b is switched ON transforming energy to the secondary of transformer 31 and reverse biasing SCR 29 which turns OFF, and output of comparator 43 switches to a low state, which prepares trigger capacitor 29d for the next cycle. As in the idle mode, if rectified secondary voltage 14a reaches the set point series pass switch 27 is turned OFF, and shunt switch 33a/33b is turned ON, causing charge speed-up switch 29 to switch OFF.

Comparator 41 with its resistors 41a, 41b, and 41c constitutes the circuit which instructs the controller as to the state of the output switches 5 and 6. When these switches are in the conducting state (G is high and hence output of logic gate 47c is low), the voltage at 14a is below 3 volts which is transmitted by diode 48 to the comparator 41. The high output from 41 maintains output of logic gate 47b low, which with 47c also low insures that switch 27 is conducting to recharge capacitor 28 while the capacitor 4 is delivering energy to the spark plug. Conversely, when the output switches are not conducting and the voltage 14a rises sufficiently to be sensed by comparator 41, the low output from 41 will turn OFF switch 27 and turn ON the shunt switch 33a/33b. The energy which has now been stored on capacitor 28 will be transferred through transformer 31 and deposited on capacitor 4 to partially recharge it. Resistors 41a and 41c insert a small amount of hysteresis in the circuit for stability, while resistor 41b is a pull-up resistor for the open collector of the comparator 41.

Certain components in the circuit produce specific functions which are described below: SWITCH 27: Resistor 27b serves to assure rapid and reliable turn off of NPN transistor 27 when it is not biased ON. PNP transistor 37 is used to amplify the base drive to NPN transistor 27 with the lowest possible forward voltage drop (from the battery to the emitter of NPN transistor 27). Resistor 37a assures a rapid and reliable turn OFF of PNP transistor 37 when it is not biased ON. Resistor 37c biases PNP transistor 37 when NPN darlington transistor 39 is saturated. Resistor 39a biases NPN darlington transistor 39 when the output of logic gate 47a is positive. As a result, series pass switch 27 is switched ON when the output of logic gate 47a is high. SHUNT SWITCH 33a/33b: Two FETs 33a and 33b are used as switching elements, and additional power FETs may be added to increase the efficiency of shunting of high currents. FETs 33a/33b are biased ON when a positive voltage is applied to their gates. C-mos inverter buffers 34a and 34b supply the drive to bias the gates of FETs 33a and 33b. Up to six inverter buffers may be connected in parallel to speed up the switching time of the FETs 33a/33b. When a positive voltage is applied to the inputs of buffers 34a and 34b, their outputs are driven to ground and FETs 33a/33b do not conduct. When a negative voltage is applied to the input of buffers 34a and 34b their outputs are driven to the positive supply voltage and FETs and 33a/33b conduct. CHARGE SPEED-UP SWITCH 29: It includes SCR 29 which is normally biased off by resistor 29b, clipping diode 29b which prevents the reverse biasing of the gate anode junction of 29, and capacitor 29d which provides a positive voltage pulse to the gate 29a of SCR 29 each time the output of comparator 43 makes the transition from low voltage to high voltage. Resistor 43a is a pull-up resistor for the open collector. ZENER REFERENCE SUPPLY: The reference supply for the comparators 41, 42 and 43 comprises the zener diode 36 itself in conjunction with resistors 36a, 36b, 36c, and capacitor 36d. The zener diode voltage of 6.2 volts has been chosen for its inherent thermal stability but since this value is too high for use when the battery voltage drops to 6 volts, the zener stabilized reference voltage is divided by resistance divider 36b and 36c to a value of approximately 4 volts. Capacitor 36d smoothes the ripple of this reference voltage. Resistor 36a is the load resistor for the zener diode.

Figure 5:
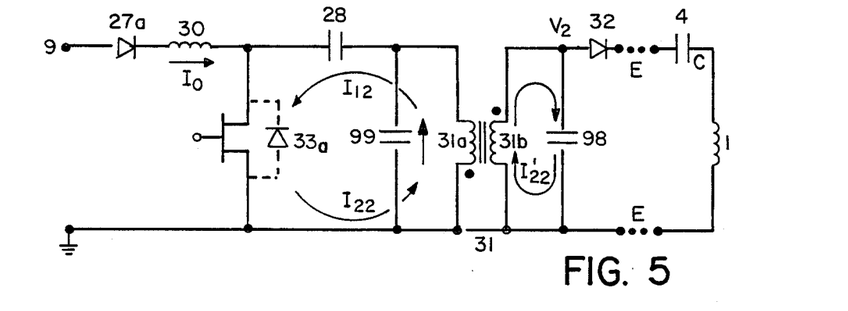
FIG. 5 depicts a circuit drawing of the optimized simplified current pump which is physically identical to that of FIG. 1a excepting for the absence of the output inductor in series with what is now defined as the tuning and feedback capacitor.

FIG. 5 depicts an optimized simplified current pump, designated hereinafter as OSCP, which has the same circuit configuration as the embodiment of FIG. 1a excepting for the removal of the inductor 25aa. Referring to FIG. 5 in which like numerals denote like parts (with respect to FIG. 1a), there has now been developed a precise prescription for picking the output capacitor 98 and the values of other parameters so as to optimize operation of the current pump and in effect provide a DC to DC power converter with what is believed is an unprecedented simplicity, with both a very high power output and efficiency, with a smooth operation, and a power output to input voltage characteristic which makes it ideal for automotive applications where the battery voltage may cover the range from fourteen volts down to seven volts under engine cranking conditions.

A major breakthrough has been achieved through the OSCP by converting the (capacitor 28) charging stage of the current pump, which ordinarily places the wrong polarity at the output stage indicated by voltage V2, to one where the "wrong" or opposite polarity voltage is used instead of great advantage. Such "wrong" polarity voltage V2 is used to energize a capacitor 98 of capacitance C2, which in turn through precise definition is used to not only feed back a portion of its energy to storage capacitor 28, but to guarantee cancellation of the current through FET 33 during FET turn-off (eliminating voltage spikes), and to minimize the overall current pump working oscillation period.

Before discussing the OSCP, an optimum turns ratio N of the transformer 31 can now be defined (especially with respect to automotive applications). It can be shown that the maximum energy transfer for the current pump occurs when the turns ratio N is equal to twice the output voltage V2 divided by the input voltage V1, i.e. when NO=2*V2/V1, where NO is the optimized turns ratio.

For the present application, we expect V1 to equal approximately 30 volts (for a fourteen volt battery), and assuming we desire to charge an output capacitor 4 (of say 4 to 8 uFarads value) to 360 volts, then the value of NO would equal:

$$NO = 2*360/30 = 24.$$

Such a design is ideal since it allows capacitor 28 to be charged to full voltage rapidly when the engine is running (and V1 is 14 volts), and slowly when the engine is being cranked and there is much time available and the voltage is low (V1 is 8 volts).

For a recently built OSCP whose parameters will be disclosed by means of an example, the time required to charge an 8 uFarad capacitor to 350 volts was 6 msec at approximately 14 volts, and 60 msec at approximately 8 volts (representing the time that is typically available at cranking conditions).

Further before discussing the OSCP, a factor is presented which has bearing to the discussion of the OSCP. This relates to the equation which governs the voltage to which capacitor 28 is charged from the battery connected to point 9. It was already disclosed that this voltage is twice battery voltage VB, but that is only the case if the initial current is zero. On the other hand an initial current IOO for charging capacitor 28 is set up as a result of current flow IO through inductor 30 when FET switch 33 is turned on and then off (where time T2 represents the time of this current build-up). This initial current IOO produces two important results with respect to charging of energy capacitor 28. It reduces the charge-up time Tch and increases the voltage to greater than twice the voltage (difference). For example, if IOO is equal to the maximum current Im that would ordinarily flow in the absence of an initial current IOO, then the capacitor 28 charge time Tch is reduced by 25% (from 180 to 135 degrees of the total charge time oscillation period), and the peak voltage V1 appearing across capacitor 28 is raised from 2 to 2.4 times battery voltage VB (assuming that capacitor 28 is initially uncharged). In fact, voltage V1 for an initial current IOO is given by:

$$V1 = VB*[1 + SQRT[1 + (IOO/Im)**2]]$$

For example, for a voltage of 12.5 volts available for charging capacitor 28, i.e. the voltage to the right of diode 27a which is preferably a schottky diode such as an MBR745, V1 is 30 volts if IOO is equal to Im. Hence, the OSCP disclosed herein is designed to advantageously use these benefits, and particularly to increase the power output of the OSCP.

Figure 5A:
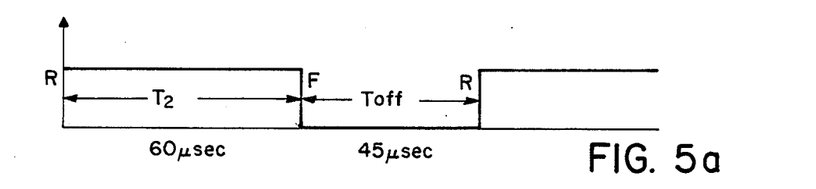
FIGS. 5a to 5d depict various waveforms corresponding to the operation of the optimized simplified current pump shown in FIG. 5.
Figure 5B:
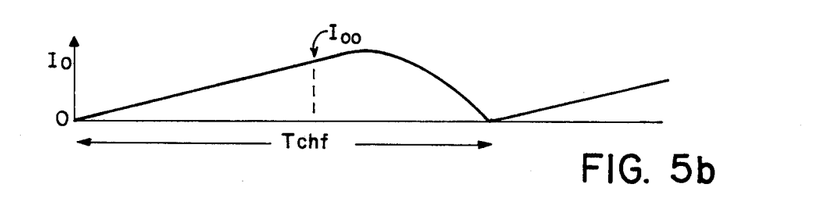
Figure 5C:
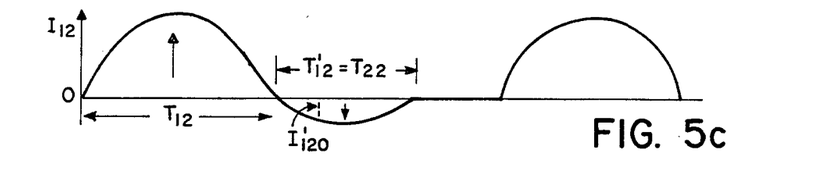

The operation of the OSCP is best understood with reference to FIGS. 5a through 5d, where FIGS. 5a, 5b, 5c correspond to FIGS. 2a, 2b, 2c respectively, which have already been disclosed and described. The periods of oscillation indicated in the figures all have the same time scale and thus correspond to each other as indicated. The key aspect of the OSCP is the placement of capacitor 98 at the output, with a value C2 given approximately by:

$$C2 = (N**2)*CO$$

Figure 5D:
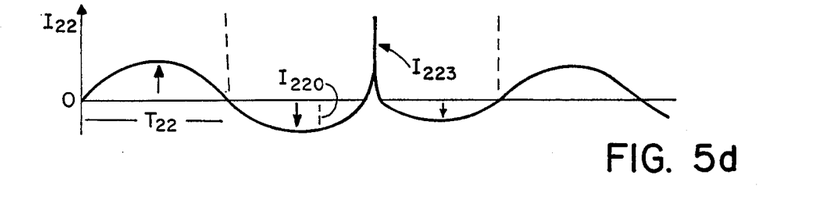

With this value of C2, it can be shown that:

$$T22 = 0.7*T12$$

where T12, shown in FIG. 5b, has already been defined a the time for capacitor 28 to discharge through its first half cycle and charge capacitor 4 through diode 32. T12', equal to T22, is the second half cycle of discharging of capacitor 28 which now charges capacitor 98 to the opposite polarity. T22 is the half-period of oscillation of capacitor 98 producing current I22' as indicated in FIG. 5 and discharging through transformer 31 and the primary circuit defined by capacitor 28, FET 33 (which is switched ON), and transformer winding 31a, to produce current I22 as shown in FIG. 5 and FIG. 5d.

Starting with the charging phase, capacitor 28 is charged to a voltage V1 and capacitor 98 is charged in phase to an opposite polarity voltage V22 within the time period Toff as indicated in FIG. 5a, which corresponds to the FET 33 off-time Toff. When FET 33 is switched ON, indicated by the rising edge R of the rectangular waveform of FIG. 5a, capacitor 98 discharges producing the oscillating current I22 shown in FIG. 5d, which for the particular values indicated earlier flows through the FET integral diode 33a with a value I220 near its maximum value at or just beyond the zero current crossing point of I12. The current I220 adds to the reverse current of I12, indicated as I120' in FIG. 5c, to more than cancel the initial charging current IOO (FIG. 5b), where IOO is given by:

$$IOO = VB*T2/LO$$

An immediate result is that an independent means has been provided to force the current through the FET 33 to zero at its turn-off. A second very important result is that the current I22 is in the direction to further charge capacitor 28 during its charging stage indicated by Toff.

With reference to FIG. 5a through 5d, the current pump cycle period Tcp (equal to T2 plus Toff) is shown to equal 105 usecs. The period T12 is hsown as 50 usecs (and T22 aproximately as 35 usecs according to our prescription). The determination for the FET 33 OFF period can be made by inspection of FIG. 5d, where the objective is to fit an integral number of oscillation periods T22 within the total period Tcp. Inspection of the waveforms indicate three T22 periods which include a very short duration spike I223 at the end of the second half cycle. This occurs because as capacitor 98 begins its third half cycle discharge FET 33 is off and diodes 33a and 27a are back biased, so the path the current must take in the primary circuit is through the very small capacitor 99 of capacitance value C3 of the order of magnitude 0.01 uFarad. This period is very short relative to T22 so that capacitor 98 flips is charge in effect instantaneously and proceeds with what is in effect its third period, which has the same direction as the second period and delivers charge to the energy capacitor 28 through diode 33a. The FET 33 switch-ON time is then set to correspond to approximately three half cycles of T22, or three times 35 usecs or 105 usecs as indicated.

The peak initial current at FET 33 turn-OFF IOO is controlled by choke inductor 30 and duration T2 and is preferably set to correspond to the maximum charge current Im. Clearly, IOO can be set at another value, say a higher value to produce a higher initial voltage V1 of, say, 40 volts or three times the available battery voltage; this condition would reduce the required charge time Toff from 180 to 120 degrees. However, whatever value of LO is used it must also be chosen to correspond to the remaining time Toff available for charging capacitor 28. The total (180 degree, zero initial current) charge time Tch is given in this case by:

$$Tch = pi*SQRT[LO*C*MU/(1+MU+LO/Lp1)]$$

where $$pi = 3.142$$

$$MU = (N**2)*C2/CO$$

For the preferred value of MU=1, Tch reduces to:

$$Tch = pi*SQRT[LO*CO/(2+LO/Lp1)]$$

which for LO much less than Lp1 further reduces to:

$$Tch = pi*SQRT[LO*CO/2]$$

Hence, it is seen that once a capacitor CO has been selected and a transformer 31 designed (with among other things an optimized turns ratio NO) then capacitor 98 is determined; then period T12 is measured, period 3*T22 calculated (which defines period Tcp), and periods T2 and Toff taken as approximately 60% and 40% to Tcp respectively. Inductor 30 is then selected to provide a charge time Tch less then that defined above by an amount related to the initial current IOO. It should be noted that since capacitor 98 charges in phase (or 180 degrees out of phase depending on one's view) with capacitor 28, then preferably the charge time Tchf as shown in FIG. 5b should be equal to or just greater than Tcp as already defined. This is because at the end of Tchf capacitor 98 has in effect been reset (recharged) and will begin to discharge. But according to the present prescription FET 33 should have just been turned-ON so that capacitor 98 sees capacitor 28 as its load through transformer 31 so that the quoted relationships between T22 and T12 are adhered to.

Finally, it has been determined that from at least a size and cost perspective it is preferable to use a smaller capacitor CO than earlier disclosed, say in the range of 5 to 20 uFarads. Clearly this will result in higher frequency operation, typically in the range of 10 to 20 KHz, but this is not a problem given the state-of-the-art of ferrite cores and other parts. In fact, the time periods T2 (60 usecs) and Toff (45 usecs) shown in FIG. 5a correspond to a 20 uFarad energy capacitor 28. More specifically, these times correspond to the following design:

```
CO   = 20 uFarads;
NO   = 25; Np = 24; Ns = 600;
C2   = 0.03 uFarad; C3 = 0.01 uFarad; C = 8 uFarads;
LO   = 40 uHenries;
Tchf = 60 usecs; Tchf' = ¾ * Tchf = 45 usecs = Toff
V2   = 360 volts; V1 = 30 volts;
```

Np, Ns are the primary and secondary turns of the transformer 31 respectively, and Tchf' has been defined as the time required to charge the capacitor 28 with an initial current IOO corresponding to Im, i.e. it is 135 of the normal 180 degrees, or ¾ of Tchf. It is of course tacitly assumed here that LO and the other parameters are selected such that all these conditions are satisfied. In the end, one experimentally makes the fine adjustments for a given capacitance C and transformer to obtain the properly phased operation of the OSCP.

While it may not be apparent here it has been experimentally shown that the OSCP represents a real breakthrough in DC to DC poer converters, especially for automotive applications. It is extremely simple, being made up of seven components, an input and output diode, an input and output capacitor (neglecting capacitor 99), one choke inductor, one transformer, and only one active component, namely FET 33, which for a 60 to 100 watt automotive power supply is preferably made up of two parallel low voltage (50 volt) Motorola FETs, such as the recently developed, very high efficiency (low RDS) BUZ11 FETs. It is low cost; it is very efficient; it can be easily scaled for a wide range of power levels; it provides rapid charging at high voltage and slow charging at low (engine cranking) voltage; it is insensitive to the load (can tolerate short circuits); and has other advantages which will become apparent to those familiar with power supplies, especially for automotive applications.

Since certain changes may be made in the above apparatus and method without departing from the scope of the invention herein involved, it is intended that all matter contained in the above description, or shown in the accompanying drawings shall be interpreted in an illustrative and not in a limiting sense.

What is claimed is:

1. A Simplified Current Pump (or SCP) DC—DC power converter which includes in series with a voltage power supply (PS) operating at a voltage Vo the following:
   (a) at least one electrical current controlling and/or limiting means (ECC),
   (b) energy storage and switching capacitor of a selected value of capacitance (CO),
   (c) electrical transformer means (T) with at least one secondary winding (TS) and with a primary winding (TP) with a selected secondary winding (TS) to primary winding (TP) turns ratio (N),
   (d) means defining a shunt switch (SS) to ground with shunt diode means across it, wherein said shunt switch (SS) is connected from ground to a point (P) between said ECC means and said capacitor CO, and
   (e) output diode means comprising at least one diode defined as the charging diode connected between a high side point (S) of said secondary winding TS of the transformer means T and an electrical load in a direction which allows said charging diode to conduct current to said load when said shunt switch (SS) is switched ON the foregoing apparatus being constructed and arranged such that during the conduction time (t-on) of the shunt switch the current in that switch first rises and then decays due to a resonant process involving said capacitor of selected capacitance value and the leakage inductance of said transformer means, and such that the shunt switch is turned off only when (i) the current in it becomes substantially smaller than its peak current or (ii) when the polarity of the current, in the combination of said shunt switch and said shunt diode across it, reverses polarity, whereby voltage spikes and turn-off switching losses in said switch are essentially eliminated or reduced to tolerable levels without the use of snubbing or clamping means across the shunt switch.

2. The system defined in claim 1 wherein said current controlling means ECC comprises in series an inductor (LO) and an input diode means which are located between said power supply (PS) and said point P with the input diode means oriented in a direction to allow passage of current from said power supply (PS), and wherein voltage input power from said power supply (PS) is converted to a higher voltage output power by sequentially turning said shunt switch ON for a time (t-ON) and OFF for a time (t-OFF) - where the sum of the times T-ON and T-OFF is equal to the total time (t-TOT), and wherein the foregoing apparatus is constructed and arranged such that the magnetic sense of said transformer T for like and input/output voltage polarities has an opposite sense between its said primary (TP) and said secondary (TS) windings in that a positive voltage appears on the high or ungrounded side (S) of said secondary winding when a negative voltage is on the high side of the primary winding (defined as point PP), and wherein said magnetic sense is reversed for reversed input or output voltage polarities, but not both, and remains the same when both input and output voltage polarities are reversed.

3. The system defined in claim 2 wherein the time period t-ON corresponds a first time period plus a fraction between zero and less than one half second time (T-SH2) where T-SH1 is a time equal to approximately the first half discharge cycle of switching capacitor CO discharging through primary winding TP via shunt switch SS, and T-SH2 is the secnd half of the discharge cycle, or capacitor CO recharge half-cycle, which recharges CO through said winding TP via said shunt diode when energy is available for such recharge, and wherein said inductor of inductance LO has a resistance RO comprising inductive time constant (T1) defined by LO/RO which is greater than time t-ON, and t-TOT is approximately equal to or less than the charge time Tch required to charge CO from said power supply PS through LO with zero initial current.

4. the system defined in claim 3 wherein said total time t-TOT is approximately equal t two times the time period t-SH1.

5. The system defined in claim 3 wherein said output diode means comprises an electrical energy delivery output rectifier stage selected from the class consisting of single charging diode halfwave rectifier stage, two diode full-wave rectifier stage comprising center tapped secondary winding of said transformer T, and four diode full-wave bridge rectifier stage, and wherein the end of time period t-ON is between the time of initial and maximum current through said shunt diode if current flows through the shunt diode, or approximately equal to the time of the first minimum current through shunt switch SS following turn-ON of switch SS if essentially no current flows through the shunt diode.

6. The system defined in claim 5 wherein said output diode means rectifier stage is said half-wave rectifier stage comprising said single diode, the latter constituting said charging diode with a high voltage capacitor (C2) connected in parallel immediatey across said secondary winding TS of said transformer T between said high side of said transformer point S and ground.

7. The system defined in claim 5 wherein said output diode means rectifier stage is said center tapped full-wave rectifier stage comprising said two diodes connected in series with each half of said center tapped secondary winding of said transformer T with diodes in turn connected together to said load, wherein one of said two diodes is said charging diode and the other is defined as the recharging/charging diode.

8. The system defined in claim 7 wherein the two secondary windings defined by the said center tapped secondary winding are of unequal number of turns.

9. The system defined in claim 5 wherein said output diode means rectifier stage is said full-wave bridge comprising said four diodes with each pair of diodes connected to each end of the secondary winding TS of said transformer T to form a full wave bridge comprising charging and recharging diode pairs.

10. The system defined in claim 5 wherein said shunt switch SS comprises one or more parallel FET switches with integral or separate diodes across them, defined as shunt FET switch (SSFET), and wherein load connected to output of said transformer T is at least one load capacitor with a capacitance value of C1.

11. The system defined in claim 10 wherein C1 is a capacitor of a capacitor discharge circuit including a transformer or ignition coil (TC) and high voltage switch (SHV) for producing and delivering very high voltage to a high voltage output circuit (HVOC).

12. The system defined in claim 11 wherein switch SHV is an SCR and HVOC is an ignition circuit including at least one spark plug defining at least one spark gap for producing ignition sparks.

13. The system defined in claim 12 wherein said SCR is fired sequentially to produce multiple spark pulses per ignition firing.

14. The system defined in claim 13 wherein the SCR turn-ON moment following the first spark plug corresponds essentially to the FET switch SSFET turn-OFF moment during the period of the multiple spark pulses.

15. The system defined in claim 14 wherein said switching of FET switch SSFET is in phase with the multiple spark pulse firing so that during the time period between the SCR turn-OFF and the SCR turn-ON, excluding any delay time in restarting said current pump SCP after the SCR turn-OFF, there occurs essentially an integer number (NTON) of time periods t-ON and essentially an integer number (NOFF) of time periods t-OFF where NTOFF is one less than (NTON).

16. The system defined in claim 15 wherein time SCR is ON corresponds to between one and three time periods of said SSFET OFF time t-OFF and wherein time t-OFF is approximately equal to between two thirds and one times the SSFET OFF time required to fully charge said capacitor CO.

17. The system defined in claim 15 wherein SCR ON-time is between 80 and 120 usecs and time between SCR firing pulses is between 200 and 300 usecs, and current pump time t-TOT is between 30 and 120 usecs, so that NTON is essentially either two, three, or four and NTOFF is essentially either one, two, or three respectively.

18. The system defined in claim 11 wherein VO is voltage from a twelve volt battery and CO is between 2 and 20 microfarads, LO is between 20 and 200 microhenries, C1 is in the range of 2 to 20 uFarads, transformer turns ratio N is between 15 and 30, and the energy storage factor (EO) of the system is in the range of 1 to 50 millijoules, where EO is defined as EO=½ *CO*((2*VO)**2).

19. The system defined in claim 18 wherein said input diode means is a Schottky type diode, said FET switch SSFET is one or more inparallel FETs of the type BUZ11, MTP45NO5E, MTP5ONO5E, CO is in the range of 3 to 10 ufarads, primary leakage inductance (Le) of said transformer T is between 4 and 20 uHenries obtained by purposely reducing coupling between windings of said transformer T, such that when capacitor C oscillates with said leakage inductance Le, as occurs in operation of said current pump SCP, the period of said oscillation is in the range of 40 to 200 usecs.

20. The system defined in claim 11 wherein VO is voltage from a twenty four volt battery CO is between 1 and 20 ufarads.

21. The system defined in claim 5 wherein a capacitor of capacitance value C2 is placed immediately across said secondary winding TS except in said center tapped secondary winding case where it is placed immediately across said secondary half winding containing the non charging diode or recharge/charging diode.

22. The system defined in claim 21 wherein the transformed capacitance TrC2 of said capacitor C2, defined by TrC2=(N**2)*C2, is approximately equal to or less than C and selected such that period t-SH1 is greater than one and less than four times the half oscillation period T22 corresponding to capacitor C2 discharging through secondary TS of transformer T with primary winding TP conducting current through capacitor CO and said shunt switch SS or shunt diode, and wherein said time period t-ON corresponds to aproximately the maximum current through said shunt diode.

23. The system defined in claim 22 wherein TrC2 is between 0.3 and 0.6 of CO and t-SH1 is between 3/2 and about 2 times the half oscillation period T22 corresponding to value of capacitor C2.

24. The system defined in claim 22 wherein said shunt switch SS is qne or more in parallel FETs and wherein total operating cycle time t-TOT is equal to between two and six times said period T22, and wherein values of said current pump SCP and time periods t-ON and t-OFF are chosen such that the current IOO through inductance LO after the time period t-ON, given by (VO)*(t-ON)/LO, is approximately equal to the maximum current Im which would flow through the series circuit defined by L0, C0, and the primary winding TP when the initial current through LO is zero.

25. The system defined in claim 21 wherein the value of capacitor C2 is approximately equal to or less than CO/(N**2), and wherein the system is further constructed and arranged to produce three simultaneous electrical events when said shunt switch is turned ON and OFF for said time period t-TOT, 1) a charging event wherein initial current IOO builds up through LO and said shunt switch during time t-ON to be then steered to charge capacitance CO and C2 during period t-OFF, 2) an event wherein capacitor CO discharges and recharges through said shunt switch and shunt diode and primary TP of transformer T, and 3) event wherein capacitor C2 oscillates through secondary TS and delivers current to CO through said shunt diode after C2 has completed its first half cycle to feed back energy to CO delivered to C2 during the charging event.

26. The system defined in claim 23 wherein said time period t-ON is approximately equal to T-SH1,and C2 is approximately equal to [0.5]*[CO/(N**2)], providing for a t-ON time period approximately equal to two times a time period (T22), where T22 is the half oscillation period corresponding to discharging of capacitor C2 through a secondary winding of transformer T with primary winding TP of transformer T conducting current through capacitor CO and through either said shunt switch or said shunt diode.

27. The system defined in claim 26 wherein said shunt switch is one or more in-parallel FETs defined as SSFET and shunt diode is integral or external to said FETs, and wherein the total operating cycle time t-TOT is approximately equal to twice the ON time t-ON.

28. The system defined in claim 27 wherein said inductance LO and ON-time period t-ON are chosen such that the current (IOO) through inductance LO after the time period t-ON, given by VO*(t-ON)/LO, is approximately equal to the maximum current (Im) which would flow through the series circuit defined by LO, CO and the primary winding TP when the initial current through LO is zero, providing a maximum charge voltage (VCO) to capacitor CO approximately equal to 2.5 times VO, where VO is voltage of said power supply.

29. The system defined in claim 28 wherein current IOO is greater than Im and said turns ratio N is chosen to equal a value (NO) according to a higher value of VCO produced by the higher value of IOO, where NO is given approximately by NO=2*VC1/VCO, where VC1 is the value to which a capacitor C1 representing said load is normally charged to for a normally fully charged battery power supply PS.

30. The system defined in claim 27 wherein said load connected to output said transformer T is a 400 volt capacitor with a capacitance value (C1) between 1 and 20 uFarads, and capacitance CO has a value also between 2 and 20 uFarads, turns ratio N is between 20 and 30 for a twelve volt car battery providing power to the current pump, inductance LO is between 20 and 200 uHenrys, and the number of primary winding turns (Np) is between 10 and 30 turns.

31. The system defined in claim 30 wherein transformer T primary winding leakage inductance Le is between 2 and 20 uHenries and is selected to provide in combination with CO a source impedance Z12 between 0.3 and 3 ohms, and said time T-TOT is between 30 and 120 usecs, and said SCP provides varying power output into discharged capacitor C1 of about 100 watts during the first few miliseconds and dropping to less than 20 watts after 10 milliseconds, charging capacitor C1 to about 300 volts in about 5 milliseconds when VO is approximately 12 volts and C1 is between 3 and 20 uFarads.

32. The system defined in claim 28 wherein said output diode means is four diode full-wave bridge rectifier stage and capacitor C2 is further adjusted to the value C2-optimum.

33. The system defined in claim 26 wherein ideal turns ratio NO of transformer T is selected according to the formula NO=2*VC1/VCO, where VC1 is the voltage to which capacitor C1 must be charged when said power supply PS is providing a voltage V which charges capacitor CO to a voltage VCO at the end of the charging stage.

34. Ths system defined in claim 33 wherein said supply PS is a battery used in conjunction with automotive engine and said ideal turns ratio NO is based on voltage VCO arising from voltage VO of said battery when said engine is operating in its normal mode.

35. The system of claim 34 wherein VC1 is approximately 350 volts, VO is approximately 12 volts which is taken as the typical loaded voltage at the point connecting said input diode means and said inductor, VCO is approximately 30 volts, and NO is accordingly approximately equal to a turns ratio of 24, and primary winding turns Np of primary TP of said transformer is between 15 and 30, and is capable of providing an average power output of about 100 watts during the first few milliseconds of charging when capacitor C1 is initially charged at 80 volts.

36. The system of claim 35 wherein said shunt switch is one or more in parallel low voltage, low RDS FETs, Motorola and containing integral diodes which may be of the zener type which limit voltage in the range of 50 to 70 volts to sustain short duration overvoltages and tens of amps of high avalanche currents through the internal zener.

37. The system defined in claim 33 wherein said output diode means is four diode full-wave bridge rectifier stage and capacitor is further adjusted to the value C2-optimum.

38. The system defined in claim 26 wherein said shunt switch SS is a high speed semiconductor switch with low saturation voltage of the class of bipolar power transistors, with an external shunt diode placed across it.

39. The system defined in claim 26 wherein said output diode means is four diode full-wave bridge rectifier stage and wherein said capacitor C2 is further adjusted to a value C2-optimum to give an oscillation period T22 such that at the end of the time period t-ON it provides a well defined but low amplitude current peak through said shunt diode of about 1/10 of the maximum current through said shunt switch, and at the end of time period t-OFF it provides charging current to capacitor CO such that the voltage on CO at the end of t-OFF is approximately at a peak value.

40. The system defined in claim 1 wherein an additional speed-up switch is connected across primary winding TP of said transformer T between intersection of capacitor CO and high side of primary of transformer, point PP, and ground, said speed-up switch being unidirectional power semiconductor device from the class of SCRs and bipolar power transistors.

41. The system defined in claim 1 wherein said electrical current controlling and/or limiting means ECC includes a semiconductor switch which is switched on at least during the time when said shunt switch is in the OFF condition during operation of said current pump.

42. The system defined in claim 5 wherein said electrical load includes an electric circuit further including capacitor means of capacitance C1 of at least 2 uFarads connected to ignition coil and at least one switch for discharging capacitor C1 into the primary of said coil for producing both high ignition voltage greater than 20 kilovolts and high ignition current discharge greater than 200 milliamps, said circuit further comprising:
   (a) a low turns ratio high efficiency ignition coil with low primary and secondary resistance and turns ratio less than sixty for voltage rating of 400 volts of capacitor C1;
   (b) high voltage capacitor of capacitance value between 0.05 and 0.4 uFarads connected directly across primary windings of said ignition coil;
   (c) spark plug means for producing sparks from said coil.

43. Electric circuit of claim 42 wherein said SCP DC to DC power converter includes one or more parallel FET switches for said shunt switch SS, capacitance CO is between 2 and 20 ufarads, said low volage power supply PS is a 12 volt car battery, and said transformer of said SCP has a turns ratio N between 15 and 30.

44. Electric circuit of claim 43 wherein said spark plug has a spark gap of width of at least 0.06" connected across secondary of said spark coil for producing spark current discharges.

45. In a power delivery system comprising a DC power supply PS and a DC to DC power converter SCP for converting low voltage input energy of voltage VO from the power supply PS to a higher output voltage V1 delivered to an electrical load by means of a step-up transformer means T, the improvement comprising:
   (1) an energy storage capacitor means of value CO as the main transformer primary side energy storage means,
   (2) an inductor LO in series with said supply PS to store as magnetic energy an amount of energy equal to a fraction of the energy stored in capacitor CO,
   (3) a shunt switch means with a shunt diode across it for shunting current derived from the power supply PS and energy storage means, said shunt switch being sequentially switched ON and OFF and constructed and arranged to produce several results;

(i) during switch ON to simultaneously enable storage of energy in said inductor L0 and to enable transfer of energy from said capacitor C0 to a load connected to the output of said transformer T, (ii) during switch OFF to enable delivery of energy stored in said inductor L0 and from said supply PS to charge up capacitor C0 to a value VC0 greater than V0, (iii) and to perform the functions (i) and (ii) such that the current through said shunt switch is zero during normal operation during the instant of shunt switch turn-OFF, (4) a capacitor of capacitance C2 connected across the output of said transformer T and of a selected value such that it can store high voltage energy during part or all of the shunt switch OFF time when capacitor C0 has energy being stored on it, and then delivers its stored high voltage energy through transformer T to capacitor C0 in such a way and phasing that as it delivers the energy to C it also reinforces the current zero condition at the shunt switch turn-OFF and helps maximize the voltage on C0 at the end of the shunt switch OFF time, and (5) means for directing current flow, the improved system as a whole being constructed and arranged such that it is able to operate essentially without current sensing or spike suppessor means (snubbers or clamps) across the shunt switch over the widely varying range of input voltages, e.g., from 7 to 14 volts, as is typical of automotive applications.

46. The system defined in claim 45 wherein said DC to DC converter includes input diode and output diode means wherein said input diode means is a Schottky diode in series with said inductor L0, and said shunt switch SS is one or more in-parallel FETs, and said capacitor C2 has a capacitance value given approximately by $[0.5]*[C0/(N**2)]$, where N is the secondary winding to primary winding turns ratio of said transformer T.

47. The system defined in claim 46 wherein said FET device making up said shunt switch has an internal diode integral to the device, such as devices selected from very high efficiency, low RDS FETs such as the BUZ11, and MTP45N05E and MTP50N05E, wherein said internal diode may also behave as a zener diode with the capabiltiy of shunting tens of amps of avalanche current when the voltage exceeds the specified 50 to 70 volts of the device.

48. The system defined in claim 46 wherein said electrical load comprises a main capacitor means C01 of a capacitive discharge system.

49. The system defined in claim 48 wherein said capacitive discharge system is part of an internal combustion engine ignition system.

50. The system defined in claim 48 wherein capacitor means C01 in turn comprises energy storage capacitor of a second of said DC to DC converter designated (SCP1) wherein SCP1 is used to provide further raising of output voltage from V1 to V2.

* * * * *